(No Model.)
W. MAJERT.
ELECTRODE.
No. 582,936. Patented May 18, 1897.
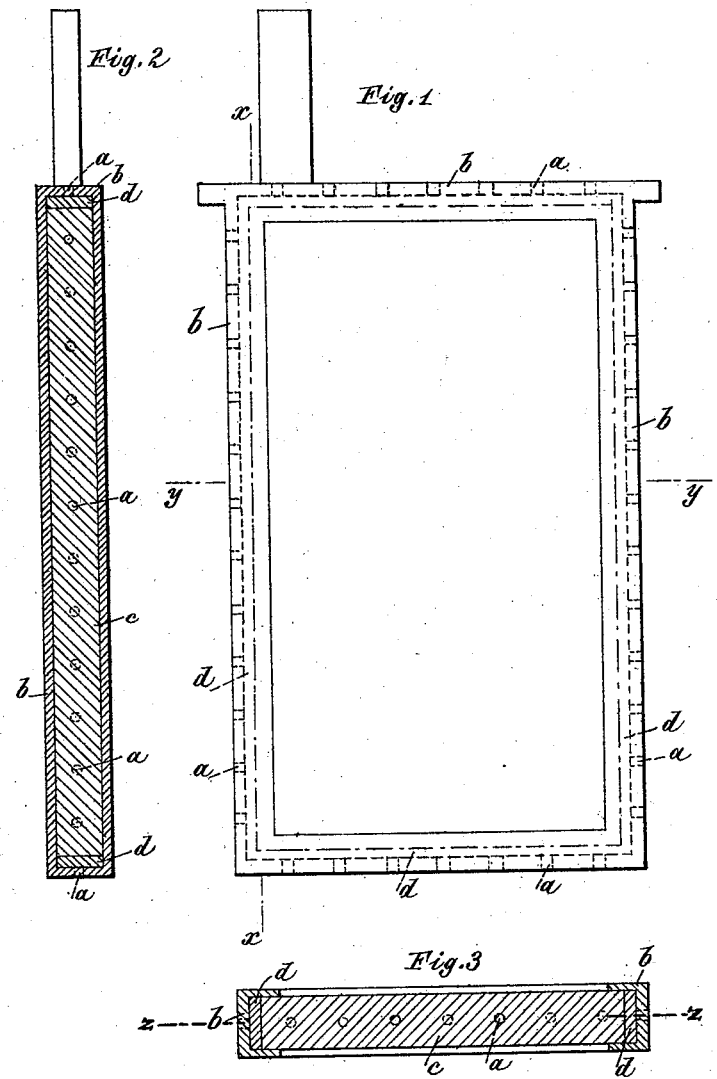

UNITED STATES PATENT OFFICE.

WILHELM MAJERT, OF FALKENBERG, GERMANY.

ELECTRODE.

SPECIFICATION forming part of Letters Patent No. 582,936, dated May 18, 1897.

Application filed May 5, 1896. Serial No. 590,289. (No model.)

*To all whom it may concern:*

Be it known that I, WILHELM MAJERT, of Falkenberg, Prussia, Germany, have invented new and useful Improvements in Electrodes, of which the following is a full, clear, and exact description.

My invention relates to electrodes for storage batteries, and has for its object to provide an electrode which will not warp or crack and in which the frame will preserve its original shape.

The electrodes for storage batteries as ordinarily constructed comprise a metal frame and an active mass or paste secured to said frame. Since during the forming of the battery said active mass expands very strongly, the frame is liable to become bent or buckled, and this defect I seek to obviate in my present invention by providing between the mass and the frame a space sufficient to allow for the expansion of the mass without affecting the shape of the frame. This space I provide, according to my invention, by first introducing into the space adapted to receive the active mass an appropriate soluble substance to partly fill said space, and after filling in the active mass and allowing the same to dry I remove the soluble substance by washing the electrode in water.

The invention will be fully described hereinafter and the features of novelty pointed out in the appended claims.

Reference is to be had to the accompanying drawings, forming a part of this specification, in which similar characters of reference indicate corresponding parts in all the views.

Figure 1 is a side elevation of the improved electrode. Fig. 2 is a sectional elevation thereof on the line $x$ $x$ of Fig. 1. Fig. 3 is a sectional plan view on the line $y$ $y$ of Fig. 1. Fig. 4 is a broken sectional elevation on the line $z$ $z$ of Fig. 3; and Fig. 5 is a broken sectional plan, similar to Fig. 3, with the soluble coating $d$ absent.

The metal frame $b$ of the electrode is provided in its exposed surface or back with small holes $a$, and on the inside of the said frame I apply a coating $d$ of a suitable soluble substance, such as sugar, salt, or sulfate of soda. This substance is preferably finely powdered and moistened for use.

The frame $b$, as shown, is made substantially U-shaped in cross-section, the soluble layer $d$ only partly filling the space between the parallel members or flanges of the frame.

The active mass $c$ is inserted after the application of the coating $d$, said mass extending into the space between the flanges of the frame $b$. When the mass has become dry and hard, the electrode is put into water, and as the liquid has access to the soluble coating $d$ through the holes $a$ said coating will be dissolved, whereby a free space will be formed between the outer edge of the filling $c$ and the inner face of the frame $b$. This space is sufficient to obviate any danger of the metal frame being affected by the expansion of the active mass $c$.

Owing to the fact that the active mass is inserted in a plastic condition, it will be in close contact with the frame, but the frame will not interfere with the expansion of the mass, and thus a good electrical action is secured, owing to the large conducting-surface in contact with the metallic frame.

The metal frame $b$ may consist of lead, and the active material $c$ may be peroxid of lead.

Having thus described my invention, I claim as new and desire to secure by Letters Patent—

1. The herein-described process of manufacturing electrodes for storage batteries, which consists in first applying to the frame of the electrode a coating or filling of a soluble substance, then applying an active mass in contact with said coating, and finally dissolving the soluble coating so as to leave a free space between the active mass and the walls of the frame, whereby the active mass may expand without producing deformation of the frame, substantially as described.

2. An electrode, comprising a conducting-frame having approximately parallel inwardly-projecting flanges forming an interior groove in the frame, and a filling of an active mass set in said groove of the frame and engaging the parallel surfaces of said flanges, the outer surface of the mass being spaced from the opposing surface of the frame, whereby the active mass may expand without causing a deformation of the frame, substantially as described.

3. An electrode, comprising a conducting-frame provided with through apertures or holes leading from its outside to its inner face, and an active mass held within the said frame and having its outer face spaced from the said apertured inner surface of the frame, substantially as described.

4. An electrode, comprising a conducting-frame, a soluble coating within said frame, the frame being provided with apertures leading to said coating, and an active mass held within the frame and separated from one surface of the frame by the said coating, substantially as described.

In witness whereof I have hereunto set my hand in presence of two witnesses.

WILHELM MAJERT.

Witnesses:
  W. HAUPT,
  SAML. ZUCKER.